ary Examiner—Edward G. Favors
United States Patent [19]
Houfek

[11] 3,951,131
[45] Apr. 20, 1976

[54] PRESSURE VESSEL WITH MULTIPLE OUTLET CONNECTIONS

[75] Inventor: Lyman Joseph Houfek, Troy, Ohio

[73] Assignee: Hobart Corporation, Troy, Ohio

[22] Filed: Oct. 11, 1974

[21] Appl. No.: 514,021

[52] U.S. Cl. .............................. 126/369; 99/469; 99/330; 126/20; 426/511
[51] Int. Cl.² .......................................... A47J 27/04
[58] Field of Search ............. 126/369, 377, 374, 20, 126/20.1, 20.2; 99/330, 326, 410, 469; 426/510, 511

[56] References Cited
UNITED STATES PATENTS

| | | | |
|---|---|---|---|
| 3,431,902 | 3/1969 | Vischer | 126/20 |
| 3,818,819 | 6/1974 | Shulz et al. | 126/369 X |
| 3,823,657 | 7/1974 | Luetolf | 126/20 X |

Primary Examiner—Edward G. Favors
Attorney, Agent, or Firm—Biebel, French & Nauman

[57] ABSTRACT

A pressure vessel arranged for use as a steam cooker and employing multiple outlet connections is disclosed. One of the outlet connections is located in the vessel floor and is of such flow capacity as to freely pass collected food particles, water and steam from the vessel. Another outlet connection is located high on a vessel wall and is of such flow capacity as to release steam from the vessel at a limited rate. The outlet connections together with a steam inlet are opened and closed in a controlled sequence in order that the functions of defrosting, cooking and vessel purging be accomplished in an improved reliable manner.

8 Claims, 2 Drawing Figures

PRESSURE VESSEL WITH MULTIPLE OUTLET CONNECTIONS

BACKGROUND OF THE INVENTION

This invention relates generally to pressure vessels and more particularly to an improved drain and venting system for pressure vessels which are used as steam cookers.

Steam or pressure-type cookers have been successfully employed by restaurants, hospitals and other food service operations to prepare quickly and conveniently large quantities of food. These steam cookers are made especially convenient for the preparation of frozen foods, by way of incorporating a defrosting step as an initial part of the total cooking process. Steam cookers of this type are well known in the art, as is illustrated by U.S. Pat. Nos. 3,071,063 and 3,071,473 issued to one George Churley. Generally, the steam cookers described in these patents operate by subjecting the food placed in the cookers to jets of pressurized steam. Because the steam jets impinge directly upon the food product and the food is subjected to a high pressure atmosphere of heat conducting steam, thawing and cooking are comparatively rapid in cookers of this type.

Typically, the drain system for prior art steam cookers has consisted of a drain pipe located in the bottom of the pressure treatment vessel and emptying into an open bell fitting which is connected with the building waste system. In this drain system a solenoid operated valve is arranged to enable and stop flow through the drain pipe.

In these prior art steam cookers the drain pipe or the drain valve or both are selected to have relatively small flow capacity and cross sectional areas, these cross sectional areas being limited in accordance with the flow capacity of the steam inlet system in order that differences in steam inflow and exhaust rates which result from the condensing of steam on frozen food can be detected. According to this method of automatic defrosting, once food in the cooker is unfrozen, the rate of steam condensation in the cooker slows noticeably and, as a result of the limited steam outlet aperture, steam pressure (and temperature) in the cooker begin to rise. In these prior art cookers this rise in steam pressure is sensed by a pressure responsive device or other steam energy sensing apparatus and the cooker drain valve is closed in response thereto. As a result of steam pressure in the vessel being related to the temperature (or vice-versa) either of these parameters can be sensed to close the drain valve. Since termination of the defrosting cycle and commencement of the cooking cycle in the vessel is dependent upon pressure buildup (or temperature rise) the vessel drain pipe and drain valve in these prior art cookers are necessarily of a size which is small enough to restrict steam outflow and allow the pressure to build in the vessel at the end of the defrost cycle.

Because the drain valve in an automatic defrost cooker is necessarily of this small size, it can readily become obstructed with food particles, which collect in the bottom of the vessel. (At least part of the food particles which fall from a cooking pan in these cookers is carried into the drain with exhausting steam, particularly at the end of a cooking cycle.) As a result of this defrosting cycle and the sensing of pressure vessel steam energy level, the existence of a clogged drain may render the cooker inoperative, since the defrost cycle is prevented from operating properly. It is therefore common that prior art steam cooker drain systems must be periodically disassembled, checked and cleaned of food particles that could plug the drain system, particularly the drain valve.

An obvious solution to this difficulty would be to simply replace the smaller drain valve by a larger one; however, such a substitution would alter the relationship between steam inflow and steam exhaust during the defrost cycle. Other factors remaining the same, a larger drain and drain valve would allow steam to continue to exhaust at about the same rate as supplied to the cooker, pressure would not build-up after the defrost part of the cycle, and the pressure sensitive switch would never sense a vessel pressure change and close the valve to complete the cooking part of the cycle.

Even the inclusion of an additional drain valve, e.g., as is shown in U.S. Pat. No. 3,804,591 to Bezrodny et al., would not prove to be a solution. The apparatus of Bezrodny et al is an autoclave having a single regulated exhaust which has two control valves in series in the exhaust to control the pressure in the autoclave, and a water drain valve in the bottom of the autoclave. Although the size and use of the water drain valve are not specified, it apparently is used only after the autoclave has been cooled down and depressurized. Such a system could only be used to sterilize sealed containers which would not produce spilled food particles. Further, it would require such a long period for depressurization and cool down that it would be useless for food service operation which requires the steam cookers to be quick and convenient, and the food to be hot.

A need therefore exists for an improved drain system for a steam cooker which will remain clear with little attention and still function as part of an automatic cook cycle.

SUMMARY OF THE INVENTION

The steam cooker of the present invention incorporates two pressure vessel outlet lines, each having a solenoid operated valve for controlling the flow of steam and fluid therein. A first cooker outlet line, a defrost line or vent line, connects with the pressure vessel at a point above the expected level of water and food accumulation; a point, for example, above the cooker midpoint or a point about two-thirds of the distance up the vessel rear wall has been found desirable for this connection.

A second pressure vessel outlet line, a drain line, connects with the bottom of the vessel. This line and its solenoid operated valve are made large enough to accommodate food particles which may escape from the food pan.

The first cooker outlet line, the vent line, is of limited flow capacity with regard to the steam inlet line or the steam generating capacity incorporated into the vessel. This limited flow capacity in the steam venting line allows steam pressure to build up in the vessel as thawing of frozen material or pre-heating of nonfrozen material occurs and allows slow release of steam at the end of a cooking cycle in certain instances where this is desirable.

In the preferred embodiment of the invention the limited flow capacity desired in the defrost or vent line and the steam inlet line is achieved through use in these lines of solenoid operated valves having limited flow capability. Combining the required flow limiting structure with the solenoid valve allows use of the smallest possible solenoid valve and allows use of off-the-shelf components designed for use in the automatic controls field.

The use of two vessel outlet lines and two valves enables the steam cooker to operate automatically through the complete cycle, including the defrosting and cooking portions thereof, while being able to drain any accumulated food solids and fluid which would otherwise clog the drain. Further, the bottom drain can use a slide action valve in connection with the tank bottom opening so that the valve will have a self-cleaning or wiping action.

To operate the improved steam pressure cooker the timer is set to the desired cooking time. This action closes a switch which closes the valve while opening the steam supply and defrost valves. This allows steam to enter the vessel to begin the defrost part of the cycle. Once the food is defrosted, pressure in the vessel begins to rise. When the pressure reaches a predetermined value, usually between three and five pounds per square inch, a pressure switch is activated which causes the defrost valve to close and starts the timer motor to begin the cooking phase of the cycle. The timer determines the amount of cooking done. Once the timer expires, the cooking phase is ended and the timer switch is opened, closing the steam inlet valve and commencing the vessel depressurizing cycle. Once the vessel is depressurized the door can be opened and the cooked food removed. Any food particles, as well as liquids, which have accumulated in the bottom of the vessel during the loading, defrosting, cooking, depressurizing or unloading portions of the cycle can be forcefully carried down the bottom drain and through the drain valve with exhausting steam.

A second use for the limited flow capacity of the steam venting connection occurs where the sudden release of full cooking pressure through the vessel drain valve creates physical disturbances in the vessel or results in an excessive quantity of steam entering the building drain and the cooking area or should otherwise be avoided. Where these occurrences are undesirable, part of the cooking steam may be released slowly from the vessel through the steam venting connection while the large drain valve remains closed until the pressure has decreased to a lower level. It is desirable, however, to open the large drain valve with the greatest acceptable pressure in the vessel since rapid release of steam through this valve tends to purge displaced food particles from the bottom of the vessel and from the drain system.

It is therefore an object of the invention to provide an improved drain system for steam pressure cookers which will allow the cooker to operate essentially automatically, including during the defrosting and cooking phases of the total cycle, while being able to carry away any accumulated food solids and liquids without the drain becoming clogged.

It is also an object of the invention to provide a plurality of operating sequences for components of the improved drain system of the pressure vessel.

Other objects and advantages of the invention will be apparent from the following description, the accompanying drawings and the appended claims.

DETAILED DESCRIPTION OF THE INVENTION

Figure 1:
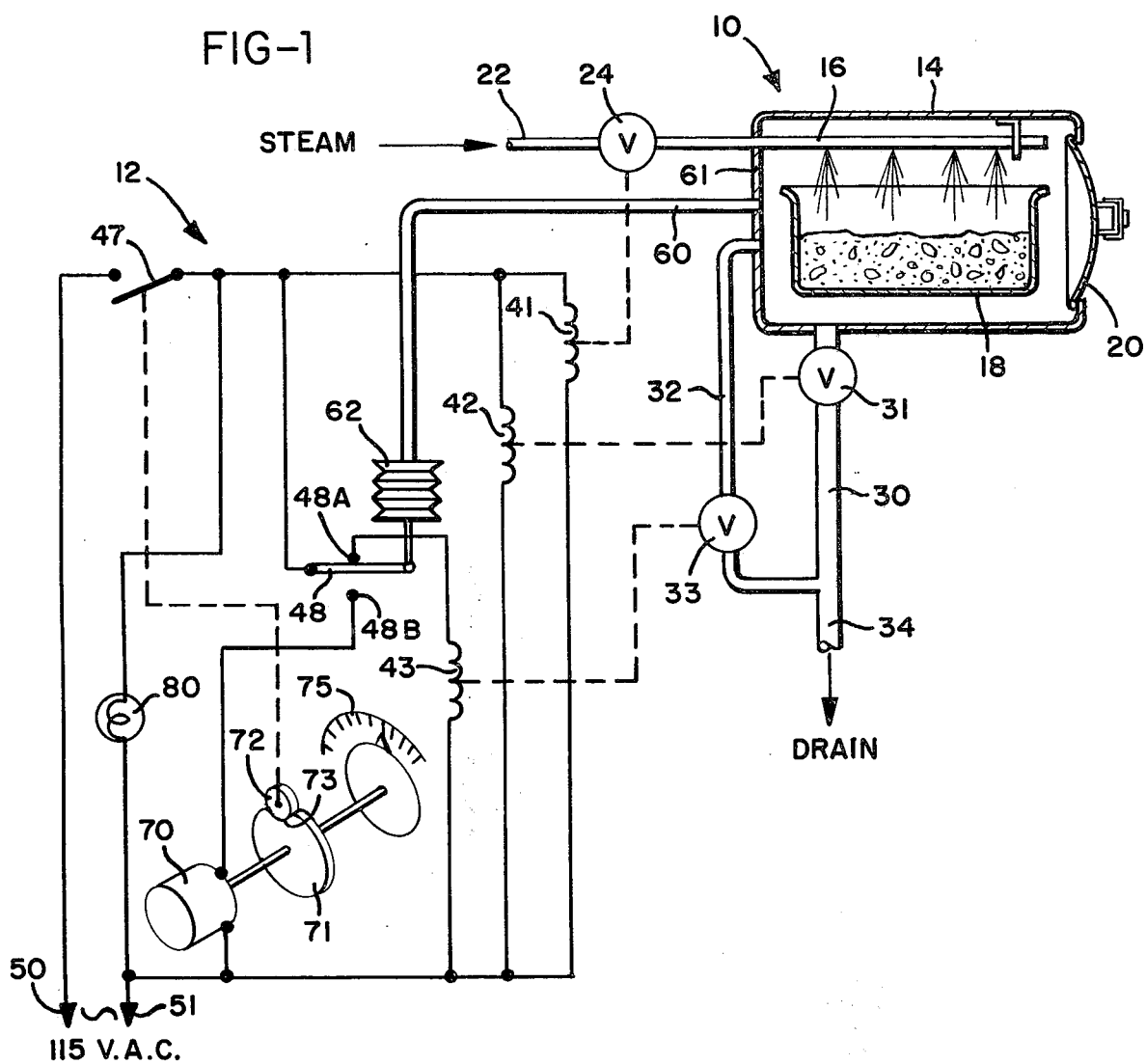
FIG. 1 of the drawings is a schematic view of a steam pressure cooker embodying the principles of the present invention.

As shown in FIG. 1 of the drawings, the steam pressure cooking apparatus includes an autoclave-type unit 10 and a control unit 12. Autoclave 10 includes a pressure treatment vessel 14, a steam injector pipe 16 having a plurality of openings, an open top food container 18, and a vessel door 20 which seals vessel 14 after food has been placed therein. Vessel 14 is a structure which is conventional in the art and normally comprises a cylinder which is closed at one end and which has at its other end an inwardly extending annular flange into which door 20 fits. A pressure and/or temperature meter (not shown) can be attached to vessel 14 if desired to enable conditions in the vessel to be monitored during cooker use.

Steam for heating food in the vessel 14 is supplied to pipe 16 from a conventional source (not shown) by pipe 22. Steam flow is controlled by a solenoid operated valve 24. Normally, the steam will be passed through a steam strainer and/or separator apparatus (not shown), such as is conventional in the art, before entering pipe 22, in order that liquid or dirt which would contaminate the food may be removed. The steam as supplied to the cooker is preferably dry steam at a pressure near 15 pounds per square inch, however, other forms of steam including wet steam and superheated steam, as well as other steam pressures may be employed in the cooker.

The improved steam cooker of the invention employs two outlet connections to the cooker pressure vessel. The first outlet connection, the defrost pipe or vent line 32 has a solenoid operated valve 33 located in the flow path. The defrost pipe or vent line 32 is located in a wall of the vessel, as opposed to the bottom. The connection of pipe 32 into the vessel 14 is sufficiently above the vessel bottom that the food particles are unlikely to be carried into it during normal operation of the cooker or venting through the pipe 32. The second outlet connection is the drain pipe 30 which connects with the bottom of the vessel 14. Flow through the drain pipe 30 is enabled or terminated by the solenoid valve 31. The two pipes 30 and 32 may be joined downstream of the valves, as at 34, so that they will empty into a common line.

The second pipe 30 and associated valve 31 is substantially larger than the first pipe 32 to the extent that the vessel drain will pass spilled food solids and liquids without becoming blocked or clogged. The first pipe and valve 32 and 33 are small enough that they will restrict steam exhaust and cause pressure in vessel 14 to build up at the end of the defrost part of the total cooking cycle.

The precise size of the vessel outlet connections and the associated solenoid operated valves will vary depending upon the size of the cooker, the steam supply capacity and other factors. Although it is possible to select the length and diameter of the pipes 16, 22 and 32 such that the pipe itself provides the desired flow limiting function, it is generally more convenient to make these pipes relatively large in size and employ solenoid valves of limited flow capacity to accomplish flow limitation. In addition to this practice assuring that the smallest possible and therefore the least expensive solenoid operated valves are used in the cooker, it also decreases the possibility of food particles or other material becoming trapped in pipe bends and fittings or in other difficult-to-clean locations.

In the automatic control art, flow through a flow limiting device is defined in terms of a factor called flow coefficient (Cv) in preference to specifying orifice sizes, flow path lengths and the other definitive parameters. The flow coefficient includes consideration of such factors as fluid viscosity, flow turbulence and flow path irregularities. Information regarding flow through a flow limiting device and the flow coefficient is included in mechanical engineering handbooks and in catalogs published by the manufacturers of flow control equipment. One such catalog is the ASCO* Red Hat* Solenoid Valves Catalog number 29 published by Automatic Switch Company, Florham Park, New Jersey, 1973.

* Registered in U.S. Patent Office

As indicated in the above catalog the flow of steam through a flow limiting solenoid valve, in pounds of steam per hour, is related to the valve flow coefficient Cv by the relation $$LB/HR = Cv \cdot Fg$$

where the factor $Fg$ is an empirical quantity relating valve inlet pressure and pressure drop across the valve. For steam in the pressure range of 1 to 15 pounds per square inch $Fg$ is stated in graphs in the above catalog to have a numerical value between 5 and 55.

One set of solenoid operated valves which has been found suitable for use in the steam inlet, steam venting or exhaust and drain line positions of the FIG. 1 steam cooker is identified in the following table.

| Location | Type | Pipe | Orifice | Cv |
|---|---|---|---|---|
| Inlet 24 | Globe | 1/4" | 3/8" | 1.2 |
| Vent 33 | Globe | 1/4" | 7/32" | 0.7 |
| Drain 31 | Straight Through | 3/4" | 3/8" | 4.3 |

As indicated by the above table, it has been found desirable to employ a valve constructed with minimum flow limitations at 31 in the drain pipe 30 in order that the food particles collected on the cooker floor not be caught in the valve during purging of the cooker and drain. Valves having a straight through flow path or valves of the slide action and gate design have been found suitable for the drain location; the latter providing a desirable self-cleaning or wiping action during opening and closing.

The above table also illustrates that in many steam cookers it is desirable for the steam vent valve 33 to have an orifice size and a flow coefficient smaller than the corresponding sizes in the steam inlet valve 24 in order that the cooker defrost cycle function in the manner previously described. Clearly with the flow through the steam vent line being less than the rate at which steam is entering the vessel, once the food is thawed, pressure in the vessel will increase.

Figure 2:
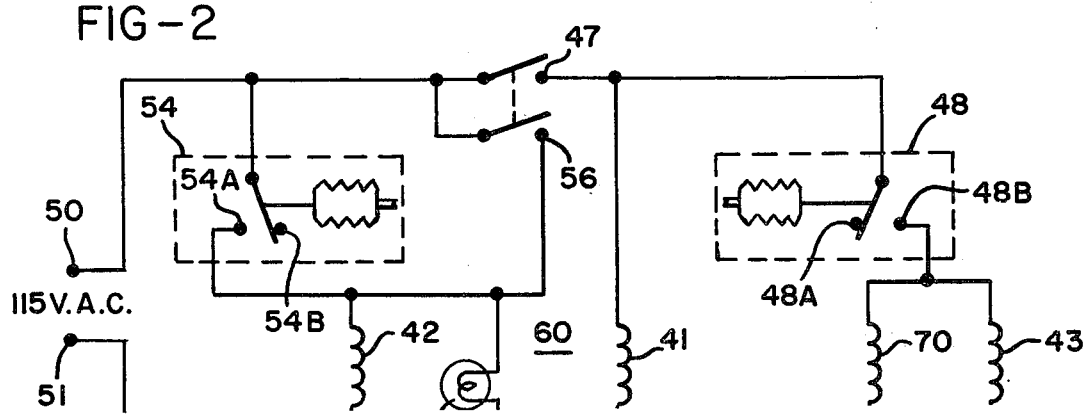
FIG. 2 of the drawings is an electrical schematic diagram of an alternate embodiment of the invention.

As shown at 12 in FIG. 1 and at 60 in FIG. 2, control means are provided for automatically opening and closing valves 24, 31 and 33 in the proper sequence and leaving them open or closed for selectable time periods, so that the defrosting, cooking, venting and purging cycle of the cooker may progress automatically.

In the preferred embodiment, valves 24 and 33 are normally closed solenoid operated valves, that is, they remain in the closed condition without electrical energization and valve 31 is a normally open solenoid valve. This arrangement of valves and especially the use of a normally closed steam supply valve 24 and a normally open drain valve 31 permits the cooker to remain in a desirable non-energized state with the chamber continuously drained during periods of disuse, such as over night and over weekends.

The use of two cooker outlet connections and the use of a normally open valve in one of these connections provides desirable assurance that the cooker will not become inoperative with the vessel under steam pressure and the drainage system jammed in the closed condition. It is unlikely that both the vent valve 33 and the drain valve 31 will become simultaneously jammed and the possibility of this event is further reduced by the arrangement wherein one of these valves is biased to remain open in the non-energized state since a normally open valve does not remain closed for the long time periods necessary for food induced corrosion or dried food packing to occur. The valves 24, 31 and 33 are of a conventional steam handling type and have operating coils which are shown schematically at 41, 42 and 43 in both FIG. 1 and FIG. 2. In FIG. 1 the operation of solenoid coils 41 and 42 for valves 24 and 31, respectively, is controlled solely by timer switch 47, while solenoid coil 43 which is connected to valve 33 is also controlled by both the timer switch 47 and a pressure controlled switch 48. These switches are of a conventional type, and their terminals are connected ultimately as shown to lines 50 and 51 of a source of power from which solenoid coils 41–43 will be energized.

A pressure conduit 60 connects the interior of the pressure vessel 14 to a pressure responsive device such as a diaphram or bellows 62, which is part of pressure controlled switch 48. The switch 48 will normally be set to operate between approximately 3.0 and 5.0 pounds per square inch pressure, preferably the lower value. A temperature sensor and switch controlled thereby can be substituted for the conduit 60 and bellows 62 because of the relation between pressure and temperature in the vessel 14.

Switch 47 is part of a timer mechanism which includes motor 70, cam 71 and cam follower 72. The cam 71 is shown rotated to the off position with follower 72 resting in a notch 73 formed in the cam surface. A manually operable dial knob 74 in association with a graduated scale 75 is used to pre-set the cam 71 and provide any desired period of cooker operation.

When it is desired to start a cooking operation, the food to be cooked, usually loose and frozen, is first placed in an open top container or tray 18 which is then placed in cooker 10. The operator then sets the timer dial knob 74 to the desired time period position on the scale 75. Actuation of dial 74 rotates the cam 71 and closes the normally open switch 47.

Closing switch 47 energizes the solenoid coils 41 and 42 causing normally closed steam valve 24 to open and normally open drain valve 31 to close. Also, pilot light 80 is energized indicating that the timer has been set and the cooker has been activated. Immediately after closing switch 47, switch 48 is the position shown in FIG. 1 with the movable switch arm connected to contact 48A. In this condition solenoid coil 43 is energized causing normally closed defrost valve 33 to open.

As a result of valve 24 being open, steam is admitted from pipe 16 into vessel 14. Once steam enters the vessel 14 it comes in contact with the relatively cool or frozen food and is rapidly condensed. Some of the steam carries air from the vessel 14 and the spaces between the particles of food and passes out of the vessel by way of the defrost steam vent pipe 32. In some situations it may also be desirable to provide additional means for air to leave the vessel 14. As a result of steam continuing to enter the vessel 14 the food in the pan is quickly defrosted if frozen or pre-heated if already above freezing with the steam penetrating the food mass so that it is completely heated. This heating continues until all of the food has been elevated in temperature. As the food temperature increases the rate of steam condensing slows, and the pressure in vessel 14 begins to increase.

The opening in solenoid operated valve 33 forms an orifice having an area that is limited in relation to the rate of steam supply such that the pressure on the interior of vessel 14 will not appreciably increase until the rapid rate of steam condensation brought on by the presence of the frozen food in the vessel slows appreciably. Once the food is thawed, the rate of condensation drops and more steam begins to pass out through pipe 32. Because of its limited flow capacity, the passage through pipe 32 and valve 33 will provide a restriction to the flow of steam from the vessel 14, and cause the steam pressure to rise in the vessel.

When the vessel pressure reaches a predetermined value, normally about 3.0 pounds per square inch, the bellows 62 operating through a snap action mechanism (not shown) opens contacts 48A and closes contact 48B of the switch 48. Opening of the contacts 48A deenergizes solenoid coil 43, and causes the defrost valve 33 to close. The interior of the vessel 14 thus rises to the full steam supply pressure and the cooking cycle proceeds. The closing of contacts 48B causes power to be applied to the timer motor 70 so that the cam 71 begins to rotate.

As soon as the notch 73 in cam 71 comes opposite to the cam follower 72, the contacts of switch 47 open. This deenergizes solenoid coils 41 and 42, so that the steam supply valve 24 is closed and the drain valve 31 is opened. With the drain valve 31 open, the steam remaining in the vessel 14 plus any food particles and liquid in the bottom of the vessel 14, pass through the drain pipe 30 and the valve 31 to the drain. The outflow of this remaining steam tends to entrain the liquids and particles in the exhausting flow, and thereby purge both the vessel and the drain system. The purged liquid and steam can readily pass through the relatively large openings of pipe 30 and valve 31. The opening of switch 47 also deenergizes light 80.

In FIG. 2 of the drawings there is shown, at 60, an alternate embodiment of the FIG. 1 control unit 12. As was described previously, once a steam vessel is provided with a plurality of outlet connections there exists a number of ways in which these outlet connections can be sequentially opened and closed. The control circuit 60 in FIG. 2 is indicative of one modified manner in which the outlet connections shown in FIG. 1 may be operated.

The control circuit 60 in FIG. 2 is similar in many respects to the circuitry shown in FIG. 1 and employs wherever possible identification numbering identical with that of FIG. 1. In particular the pressure switch 48, the valve solenoid coils 41, 42 and 43, the timer motor 70, the supply terminals 50 and 51, the timer switch 47 and the pilot lamp 80 are each directly related to the corresponding components in FIG. 1, except that solenoid coil 43 in FIG. 2 controls a normally open defrost valve.

The control circuit 60 in FIG. 2 includes, in addition to the FIG. 1 components, an additional timer switch contact 56, a second pressure operated switch 54 and an altered wiring circuit for the drain valve solenoid coil 42, the pilot lamp 80 and the defrost valve solenoid coil 43.

Operation of the steam cooker which employs the control circuit of FIG. 2 commences when an operator closes timer switch contacts 47 and 56; this action applies power to pilot lamp 80 and to the solenoid coils 41 and 42 causing the drain valve 31 to close and the steam inlet valve 24 to open. With the steam inlet valve 24 open, the drain valve 31 closed, and the defrost valve 33 open, the defrost cycle proceeds in the manner described for the FIG. 1 cooker.

Once pressure in the vessel 14 reaches the point of closing pressure operated switch 48 in FIG. 2 (3 to 5 psi), power is applied to contact 48B, energizing the solenoid coil 43, closing the defrost valve 33, and starting the timer motor 70 so that the cooking interval commences.

As the pressure in the vessel 14 continues to rise in FIG. 2 above the 3 to 5 psi level some higher pressure level, near 7½ psi for example, is reached and the second pressure switch 54 is actuated. Closure of contact 54A in pressure switch 54 produces no immediate change in the steam cooker operation since contact 54A merely shunts contact 56 in the timer; instead closure of contact 54A preconditions the cooker for modified operation at the end of the cooking cycle.

Completion of the cooking cycle occurs in the FIG. 2 circuit when the timer switches 47 and 56 open in the same manner as switch 47 in FIG. 1; this act removes power from the solenoid coils 41 and 43 causing the normally closed steam supply valve 24 to close and the normally open defrost valve 33 to open. At this time the solenoid coil 42 of the drain valve 31 remains energized by way of the previously made circuit through pressure switch 54. With the defrost valve 33 open, the steam supply valve 24 and the drain valve 31 closed, pressure in the vessel 14 releases slowly; the rate of this pressure release is determined by the limited flow capacity of the defrost or vent valve 33.

The slow release of steam from the vessel 14 at the end of the cooking interval is one distinction between a cooker employing the FIG. 2 control circuit and a cooker employing the FIG. 1 circuit. This slow release of pressure is desirable in situations where turbulence in the vessel or the rapid flashing of heated water within the cooker into steam produces undesirable disturbances in the food within the vessel. Disturbances of this type may, for example, throw small particles of food such as corn, rice or peas out of the food container onto the vessel floor. Certain foods of course are not readily disturbed by conditions within the vessel, these foods such as lobster, whole vegetables and large portions of meat may be prepared in steam cookers which employ the simpler FIG. 1 control circuit. Slow release of steam from the vessel 14 may also be desirable in situations where a large cooker is used without an exhaust steam condenser in a small kitchen. With this set of conditions, the sudden release of steam through the large cooker drain valve may permit an undesirable amount of steam or vapor to escape from the building drain and enter the kitchen area.

Once the vessel pressure in the FIG. 2 cooker drops to the actuating level of pressure operated switch 54, the solenoid coil 42 is deenergized and the drain valve 31 is opened; at this time the steam remaining in the vessel purges the water and collected food particles from the floor of the vessel and through the drain system in the manner previously described.

A second distinction between the FIG. 1 and FIG. 2 steam cookers concerns the change of the defrost valve 33 from a normally closed valve in the FIG. 1 cooker to a normally open valve in the FIG. 2 cooker. This change can be accomplished by energizing solenoid coil 41 from the normally open side of pressure switch 48 rather than from the normally closed side as in FIG. 1; this change is illustrative of the alternate embodiments of the invention which are possible.

In some embodiments of the invention, it may be desirable to incorporate yet a third pressure operated switch into the cooker control circuit. Such a third pressure switch may for example be used to actuate a pilot lamp and an audible signal upon completion of both the cooking and the purging portions of the cooker operating cycle. If this third pressure switch were made responsive to the attaining of very low pressure in the vessel (½ psi, for example) the pilot lamp 80 and the audible signal would be indicative of almost total depressurizing of the vessel 14 rather than the opening of the drain valve as in the FIG. 1 and FIG. 2 circuits.

Thus, the improved steam pressure cooker of the invention possesses two vessel outlets, a defrost outlet and a bottom drain, which enable the cooker to defrost and cook foods at two different steam pressures and essentially automatically through having a restricted outlet which operates during the defrost part of the cycle, and a larger bottom drain which is unlikely to become clogged or plugged as a result of food particles being trapped therein.

Although the present invention has been described with regard to an autoclave type unit which is used for the steam cooking of food, the apparatus describe and the invention can be readily applied to sterilizers industrial equipment, autoclaves, self-contained pressure apparatus and other products employing pressure processing.

While the form of apparatus described constitutes a preferred embodiment of the invention, it is to be understood that the invention is not limited to this precise form of apparatus, and that changes may be made therein without departing from the scope of the invention which is defined in the appended claims.

What is claimed is:

1. In a steam pressure cooker including a pressure treatment vessel, an inlet connected to a source of pressurized steam, an exhaust and drain system, and a control means for controlling the flow of steam into and the flow of steam plus collected liquid and/or food particles out of said vessel whereby foods can be automatically preheated, defrosted, and cooked during consecutive periods, the improvement in said exhaust and drain system comprising:

a drain pipe connected to the bottom of said vessel and having a valve therein through which is drained liquids and/or food particles, said valve being controlled by said control means so that it remains closed during the preheating, defrosting, and cooking periods, and a restricted exhaust means connected to said vessel and having a separate valve therein which is maintained open by said control means during the preheating or defrosting periods, said restricted exhaust means allowing the pressure in said vessel to increase at the end of the defrosting period, and said control means operating at the end of the defrosting period to close said separate valve for the cooking period.

2. A steam pressure cooker comprising;

a pressure cooking vessel, an inlet connected to said vessel from a source of steam under pressure, an inlet control valve in said inlet, a drain pipe connected to the bottom of said vessel to exhaust steam along with any collected condensate and food particles, a drain control valve in said drain pipe, a defrost outlet pipe also connected to said vessel providing a separate exhaust for steam, a defrost control valve in said defrost pipe, said defrost pipe and defrost control valve providing a restricted steam exhaust outlet correlated to said inlet whereby the internal pressure will increase in said vessel when steam is admitted through said inlet and only said defrost control valve is open once the steam no longer is condensed significantly within said vessel, a power supply, a timer having a drive motor, a controller for each of said valves, condition responsive means communicating with the interior of said vessel and responsive to condition change therein indicative of the end of rapid steam condensation, a timer switch controlled by said timer, a defrost control switch controlled by said condition responsive means, a first control circuit connecting said inlet valve controller and said drain valve controller to said power supply through said timer switch and operative to open said inlet valve and close said drain valve, a second control circuit connecting said power supply through said timer switch to said defrost control switch and then either to said defrost valve controller or to said timer motor and operative first to open said defrost valve and subsequently to start said timer motor and close said defrost valve upon operation of said condition responsive means, said timer being arranged to close said timer switch and commence a cycle upon setting said timer to a predetermined condition and to open said timer switch when said motor drives said timer through the selected elapsed time interval to close said inlet valve and open said drain valve.

3. In a steam processing apparatus for heating open trays of food and the like, including a closable vessel, a steam source connected to said vessel and inlet means connected to control steam flow into said vessel, a drain connected to the bottom of said vessel and a drain valve connected to control flow from said vessel into said drain, the improvement comprising:

venting means including a pipe connected into said vessel at a point above the level of condensate and particle collection in the bottom of said vessel and also connected into said drain beyond said drain valve, said venting means limiting flow therethrough with respect to the supply rate of said steam source;

vent valve means connected to control flow through said venting means; and control means connected to each of said valves and arranged to supply steam and to open said vent valve means and to close said drain valve means during the initial portion of the apparatus operating cycle.

4. Steam processing apparatus as defined in claim 3, wherein said control means is connected to close said vent valve means at the end of said initial period in response to conditions in said vessel indicating cessation of steam condensation therein.

5. Steam processing apparatus as defined in claim 4, wherein said control means includes an electric control circuit incorporating a timer having means to be preset to variable time periods for the total operating cycle.

6. Steam processing apparatus as defined in claim 4, wherein said control means is connected to open said drain valve at the end of the operating cycle whereby steam pressure in said vessel is released through said drain valve to carry liquids and food particles into said drain.

7. Steam processing apparatus as defined in claim 4, wherein said control means is connected to open first said vent valve means and then said drain valve at the end of the operating cycle to minimize turbulence in said vessel as steam pressure is released.

8. In a steam cooker for heating open trays of food and the like, including a pressure vessel fitted with a sealable access door, a steam source connected to said vessel and a solenoid operated inlet valve connected to control steam flow into said vessel, a drain connected to the bottom of said vessel and a solenoid operated drain valve connected to control flow from said vessel into said drain, the improvement comprising:

venting means including a pipe connected into said vessel at a point above the level of condensate and particle collection in the bottom of said vessel and also connected into said drain beyond said drain valve, said venting means limiting flow therethrough to an amount less than the supply rate of said steam source;

a solenoid operated vent valve connected to control flow through said venting means;

said drain valve and said drain having substantially greater flow capacity than said venting means, an electrical control circuit connected to each of said valves and including a presettable timer arranged to supply steam and to open said vent valve and to close said drain valve during the initial portion of an operating cycle, means in said circuit responsive to cessation of steam condensation in said vessel and connected to close said vent valve and to maintain said vessel under steam pressure;

and said timer being connected to release the steam from said vessel at the end of the time period to which said timer is preset.

* * * * *